Oct. 19, 1937.   D. L. KNIGHT ET AL   2,096,251
CLUTCH MECHANISM
Filed Sept. 23, 1935   2 Sheets-Sheet 1
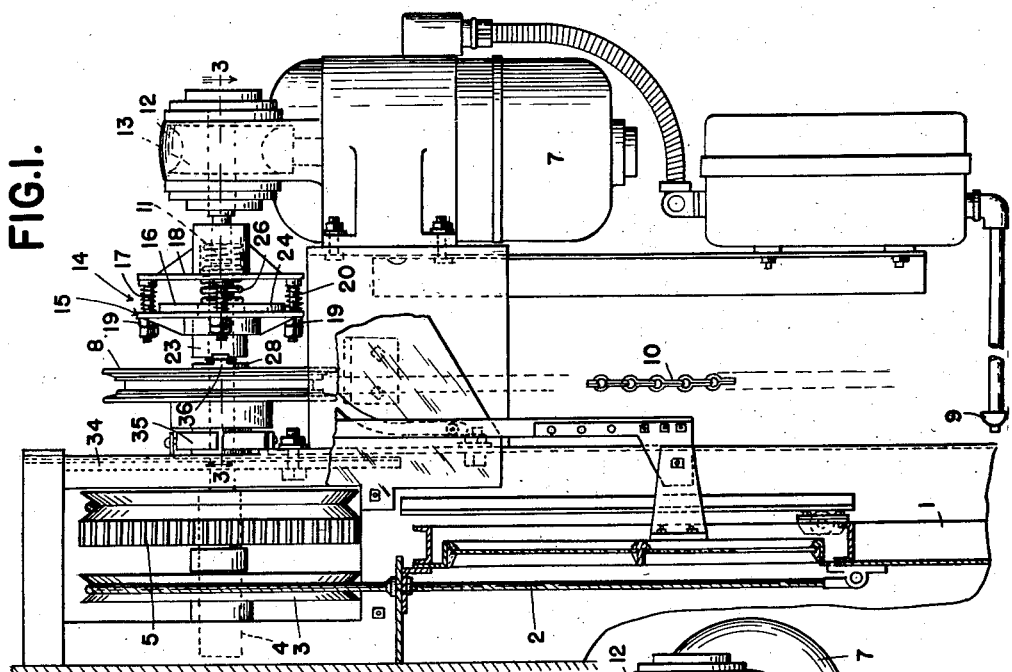
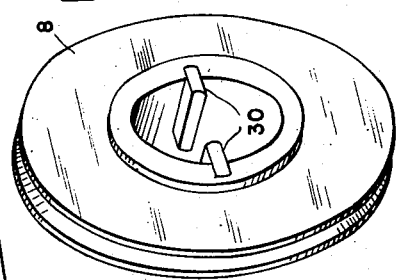
INVENTORS
DONALD L. KNIGHT
JOSEPH N. McLOUGHLIN
BY
ATTORNEYS Oct. 19, 1937.   D. L. KNIGHT ET AL   2,096,251
CLUTCH MECHANISM
Filed Sept. 23, 1935   2 Sheets-Sheet 2
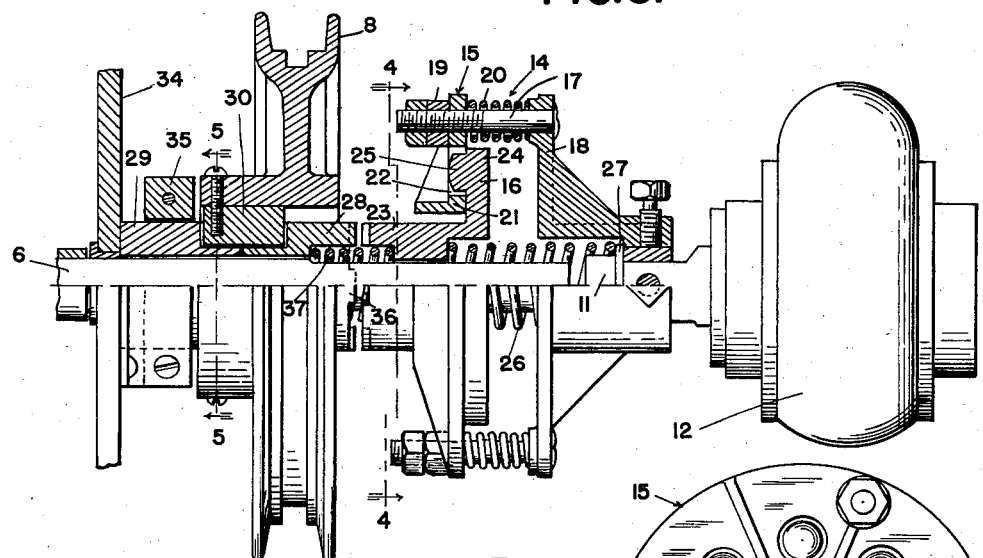
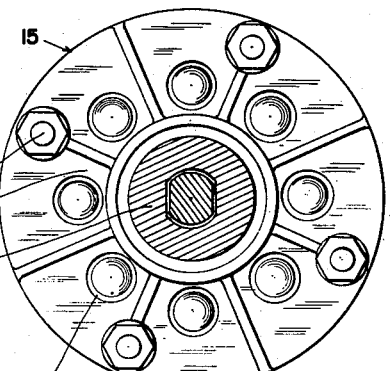
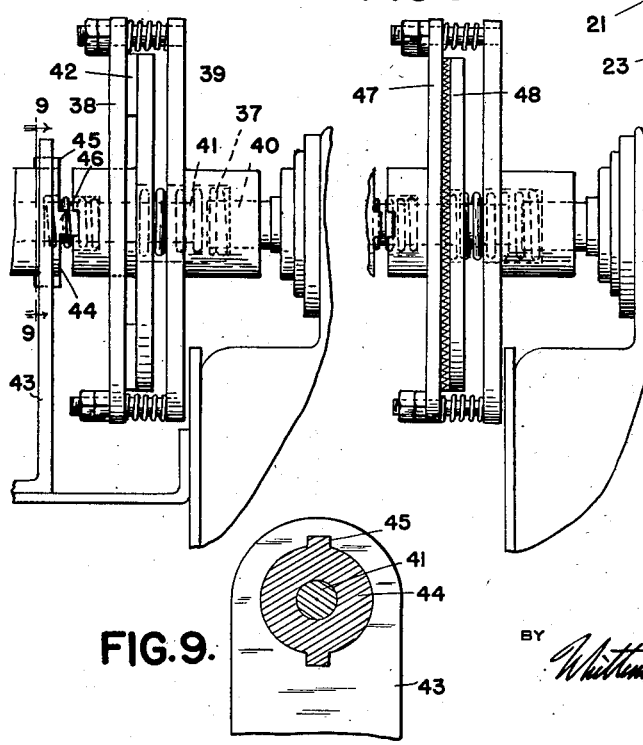
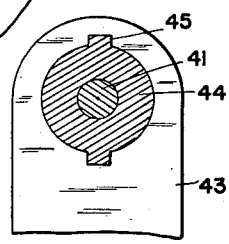
INVENTORS
DONALD L. KNIGHT
JOSEPH N. McLOUGHLIN
ATTORNEYS Patented Oct. 19, 1937

2,096,251

UNITED STATES PATENT OFFICE 2,096,251

CLUTCH MECHANISM

Donald L. Knight, Detroit, and Joseph N. McLoughlin, Northville, Mich., assignors to Detroit Steel Products Company, Detroit, Mich., a corporation of Michigan Application September 23, 1935, Serial No. 41,812

9 Claims. (Cl. 74—407)

The invention relates to clutch mechanisms and refers more particularly to clutch mechanisms for connecting separably operable drive members to a power shaft.

The invention has for an object to provide an improved clutch mechanism which normally maintains driving connection between the power shaft and one of the drive members. The invention has for another object to provide a clutch mechanism which is automatically operable upon operation of the other of the drive members to release the first drive member from the power shaft, and effect driving connection between the power shaft and the other of the drive members. The invention has for a further object to provide a clutch mechanism which is dependable in operation and sturdy in construction.

These and other objects of the invention will become apparent from the following description, taken in connection with the accompanying drawings, in which Figure 1 is a side elevation of a clutch mechanism and a member operated thereby, showing an embodiment of our invention;

Figure 2 is a plan view thereof;

Figure 3 is a cross section on the line 3—3 of Figure 1;

Figures 4 and 5 are cross sections on the lines 4—4 and 5—5 respectively of Figure 3;

Figure 6 is a detail perspective view with the parts separated;

Figures 7 and 8 are views showing modified constructions of clutch devices;

Figure 9 is a cross section on the line 9—9 of Figure 7.

The clutch mechanism embodying our invention is designed particularly for use in apparatus for opening and closing doors, but it is apparent that in its broader aspects the clutch mechanism may be used in other apparatus.

As illustrated in the present instance, 1 is a door which is adapted to be opened and closed by being raised and lowered. This door is adapted to be raised by suitable means, such as cables 2, which extend over the sheave 3. In the present instance, these sheaves are mounted upon the countershaft 4, which latter is driven by the gearing 5 from the power shaft 6. The sheaves, countershaft, gearing and power shaft are located above the door and gravity is depended upon to lower the door to close the same.

For driving the power shaft, I have provided the electric motor 7 and also the manually operable drive member 8, the operation of the motor being controlled from the push button station 9 which is at a height such that it is readily accessible to the operator. The manually operable drive member is a chain wheel which is adapted to be operated by the chain 10 depending from the chain wheel a distance such that it is also readily accessible to the operator.

11 is a drive shaft forwardly beyond the power shaft 6 and in axial alignment therewith. This drive shaft is journaled in the gear housing 12 which is mounted upon the motor housing and this drive shaft is driven from the motor shaft by suitable gearing 13. The drive shaft 11 is normally connected to the power shaft 6 at all times through the clutch device 14. This clutch device comprises the drive clutch member 15 and the driven clutch member 16, the former being mounted upon the studs 17 which are secured to and extend rearwardly from the coupling member 18 fixedly secured upon the drive shaft 11. The drive clutch member is normally held against the nuts 19 by means of the coil springs 20 abutting the drive clutch member and the coupling member. This drive clutch member has the portion 21 which extends transversely of the axis of the power shaft 6 and which is provided with the annular series of holes 22. The driven clutch member 16 has the hub 23 which is slidably mounted upon the power shaft 6 and has a driving engagement with this power shaft so that the driven clutch member and the power shaft will rotate as a unit. As shown, the power shaft is milled off flat on opposite sides and the shaft opening in the hub is correspondingly shaped. The driven clutch member also has the portion 24 which extends transversely of the axis of the power shaft and which is provided with the annular series of projections 25 for engaging in the openings 22 whereby the drive clutch member will rotate the driven clutch member. To normally maintain the drive and driven clutch members in operative driving relation with the projections 25 in the openings 22, we have provided the compression coil spring 26 encircling the adjacent ends of the power shaft 6 and drive shaft 11 and abutting the rear end of the hub 23 of the driven clutch member and the washer 27 which abuts the hub portion of the coupling member 18.

For the purpose of releasing the drive shaft 11 from the power shaft 6 and operatively connecting the chain wheel 8 to the power shaft 6, we have provided the front and rear release members 28 and 29 respectively and the diametrically opposite keys 30. These release members are journaled upon the power shaft 6 and extend into and carry the chain wheel 8. Each of these release members is provided on its opposite sides with the V-shaped cam faces 31 and the cam faces of the two release members are opposed with the V's extending away from each other. The front release member also has the diametrically opposite axially extending projections 32 which when the parts are assembled extend into the diametrically opposite recesses 33 in the rear release member so that the two release members are always adapted to be rotated as a unit. The keys 30 which are rotatable with the chain wheel 8 are located on opposite sides of the axially extending projections 32 and are adapted to engage the cam faces 31 upon rotation of the chain wheel relative to the release members. The lengths of these keys are such that they are adapted to engage the axially extending projections 32 to drive the release members with the chain wheel and still permit the axially extending projections 32 to engage in the recesses 33. The rear release member is held from rearward movement axially of the power shaft 6 by abutting against the power wall or plate 34 and this rear release member is also frictionally held from rotation by the brake blocks 35 which are adjustably mounted upon the power wall or plate. The resistance offered by the brake blocks is preferably only such as to provide for the necessary rotation of the chain wheel 8 to the two release members to secure the spreading apart of the release members and the engagement of the keys 30 with the axially extending projections 32.

It will thus be seen that the front release member is axially slidable upon the power shaft 6 forwardly toward and away from the driven clutch member 16. The cam faces 31 have an angle such that the front release member may be moved forwardly a sufficient distance to engage the driven clutch member 16 and move this forwardly a sufficient distance to disengage the projections 25 from the openings 22, at which time the driven clutch member is in inoperative driving relation with respect to the drive clutch member. The front end of the front release member and the rear end of the hub 23 of the driven clutch member are provided with the cooperative projections 36 for driving the driven clutch member upon disconnection of this member with the drive clutch member. 37 is a compression coil spring encircling the power shaft 6 and located in recessed portions of the front release member and the hub of the driven clutch member for yieldably moving the front release member to its normal position, at which time the keys are in substantial registration with the apices of the V-shaped cam faces.

In operation, the electric motor 7 is normally operatively connected at all times to the power shaft 6 through the intermediate clutch device 14. However, pulling on the auxiliary hand operated chain 10 to rotate the chain wheel 8 in either direction automatically disconnects the motor from the power shaft and automatically connects the chain wheel to the power shaft, this being accomplished through the release members 28 and 29 and the keys 30 and also the driven clutch member 16 of the clutch device 14. Upon releasing the pull on the chain, the chain wheel is automatically disconnected from the power shaft and the motor is automatically connected again with the power shaft through the coil springs 26 and 37 returning the parts to their normal positions.

By reason of the friction device comprising the brake blocks 35, the release members are held from revolving with the chain wheel when the hand chain is pulled until the release members have been spread apart and disengage the driven clutch member from the drive clutch member, at which time the keys engage the axially extending projections of the front release member to positively drive the same with the chain wheel. This friction device also functions to hold the chain wheel from revolving during the operation of the motor to drive the power shaft.

The construction is such that even when the motor is operating it can be disconnected from the power shaft by pulling on the hand operated chain to revolve the chain wheel in either direction and thereby through the release members and the driven clutch member connect the chain wheel to the power shaft to rotate the same in either direction to thereby raise and lower the door, irrespective of the direction of rotation of the motor. Also upon releasing the pull on the hand operated chain with the motor still in operation the connection between the motor and the power shaft will automatically be made so that the motor may then drive the power shaft. However, when the motor is running at normal speed and in a direction to raise or open the door, the motor is ordinarily not disconnected from the power shaft by operation of the hand operated chain because of the effort required to pull the chain faster than the motor and to raise or open the door independent of the motor.

In the modification of clutch shown in Figures 7 and 9, it will be noted that the drive clutch member 38 and the driven clutch member 39, which are respectively connected to and rotatable with the drive and power shafts 40 and 41 respectively, are in the nature of disks or plates. Between these clutch members there is the annular friction facing 42 which may be secured to either and is frictionally engageable with the other. It will also be noted that there is a different device for holding the release members when in their normal positions from revolving with the chain wheel upon pulling the hand chain until the release members have been spread apart. The arrangement of the release members, the chain wheel, the keys and the power wall or plate is substantially the same as that shown in Figures 1 to 6 inclusive, but the device comprises the plate 43 and means upon the plate and the front release member 44 adapted to positively hold the front release member from revolving when in its normal position. More in detail, the front release member has the diametrically opposite ears or lugs 45 and the plate has a grooved hole corresponding in shape to the front release member and its ears or lugs. The ears or lugs are positioned upon the front release member to engage the grooves when the front release member is in normal position and to become disengaged from the grooves after the front release member has been spread away from the rear release member and disengaged the drive and driven clutch members, the cooperative driving projections 46 upon the front release member and driven clutch member becoming engaged at this time.

In the modified construction of clutch device shown in Figure 8, the drive and driven clutch members 47 and 48 are provided with radial serrations which are interengageable to effect the driving of the driven clutch member from the drive clutch member.

What we claim as our invention is:
1. The combination with a power shaft having a fixed axis of rotation, of a motor shaft normally connected to said power shaft, a drive member operable independently of said motor shaft and normally unconnected to said power shaft, and means operable upon operation of said drive member in either direction for disconnecting said power shaft from said motor shaft and connecting said power shaft to said drive member, said means comprising a clutch member slidably mounted upon said power shaft and having a driving connection therewith and a member encircling said power shaft and engageable with said clutch member.

2. The combination with a power shaft having a fixed axis of rotation, of a motor shaft normally connected to said power shaft, a manually operable drive member normally unconnected to said power shaft, and means external to said power shaft operable upon manual operation of said drive member in either direction for disconnecting said power shaft from said motor shaft and connecting said power shaft to said drive member.

3. The combination with a power shaft having a fixed axis of rotation, and a motor shaft, of normally operative means for driving said power shaft from said motor shaft, a manually operable drive member normally unconnected to said power shaft, and means encircling said power shaft and supporting said drive member and dependent upon manual operation of said drive member for rendering said first mentioned means inoperative and for driving said power shaft from said drive member.

4. The combination with a motor shaft and a power shaft, of drive and driven clutch members connected to said motor and power shafts respectively, means for normally maintaining said clutch members in operative driving relation, a drive member operable independently of said motor shaft, and normally unconnected to said clutch members, and means operable upon operation of said drive member in either direction for relatively moving said clutch members from operative driving relation to inoperative relation and also for operatively connecting said power shaft to said drive member through said driven clutch member.

5. The combination with a motor shaft and a power shaft, of drive and driven clutch members connected to said motor and power shafts respectively, means for normally maintaining said clutch members in operative driving relation, a manually rotatable drive member, and means rotatable upon rotation of said drive member in either direction and including a cam member for relatively moving said clutch members from operative driving relation to inoperative relation, and also for operatively connecting said power shaft to said drive member through said driven clutch member.

6. The combination with a drive shaft and a power shaft, of drive and driven clutch members upon and rotatable with said drive and power shafts respectively, said driven clutch member being slidable axially of said power shaft, means for normally maintaining said clutch members in operative driving relation, a rotatable wheel, cam members journaled upon said power shaft, one of said cam members being slidable axially of said power shaft toward and into engagement with said driven clutch member to move the same from operative driving relation with respect to said drive clutch member, cooperating means upon said last mentioned cam member and said driven clutch member for driving the latter from the former upon engagement thereof, and means rotatable with said wheel and engageable with said cam members to move said axially slidable cam member toward said driven clutch member and to rotate said cam members.

7. The combination with a drive shaft and a power shaft, of drive and driven clutch members upon and rotatable with said drive and power shafts, respectively, said driven clutch member being slidable axially of said power shaft, means for normally maintaining said clutch members in operative driving relation, a chain wheel, front and rear release members journaled upon said power shaft and extending within said chain wheel, said release members having opposed cam faces and being rotatable as a unit, said front release member being slidable axially of said power shaft forwardly toward and into engagement with said driven clutch member to move the same from operative driving relation with respect to said drive clutch member, cooperating means upon said front release member and said driven clutch member for driving the latter from the former upon engagement thereof, means for yieldably moving said front release member rearwardly, means for limiting the rearward movement of said rear release member, and means rotatable with said wheel and engageable with the cam faces of said release members to move said front release member forwardly and to rotate both of said cam members.

8. Apparatus for operating a door, comprising a motor shaft, a power shaft, means for normally connecting said shafts, a release member journaled on one of said shafts, a manually rotatable drive member carried by said release member, means comprising a member for both rotating and advancing said release member toward said first mentioned means to render the same inoperative and to operatively connect said drive member to said power shaft.

9. Apparatus for operating a door, comprising a motor shaft, a power shaft, drive and driven clutch members connected to said motor and power shafts respectively and normally connected together, a rotatable chain wheel and means operable upon rotation of said chain wheel in either direction to disconnect said clutch members and connect said driven clutch member to said chain wheel, said means comprising a release member engageable with said driven clutch member and arranged to be rotated by said hand wheel.

DONALD L. KNIGHT.
JOSEPH N. McLOUGHLIN.